United States Patent [19]
Fautier

[11] Patent Number: 5,113,243
[45] Date of Patent: May 12, 1992

[54] METHOD OF AND DEVICE FOR DECODING ANIMATED IMAGES

[75] Inventor: Thierry Fautier, Paris, France

[73] Assignee: U.S. Philips Corporation, New York, N.Y.

[21] Appl. No.: 623,009

[22] Filed: Dec. 6, 1990

[30] Foreign Application Priority Data
Dec. 8, 1989 [FR] France .................. 89 16253

[51] Int. Cl.$^5$ ............................................. H09N 9/64
[52] U.S. Cl. ................................. 358/21 R; 358/160
[58] Field of Search .............. 358/13, 21 R, 138, 133, 358/136, 160

[56] References Cited
U.S. PATENT DOCUMENTS

| | | | |
|---|---|---|---|
| 4,602,275 | 7/1986 | Smith et al. | 358/21 R X |
| 4,623,922 | 11/1986 | Wischermann | 358/21 R X |
| 4,745,462 | 5/1988 | Dischert et al. | 358/21 R |
| 4,758,881 | 7/1988 | Laspada | 358/21 R |
| 4,857,992 | 8/1989 | Richards | 358/21 R X |

Primary Examiner—Victor R. Kostak
Attorney, Agent, or Firm—Edward W. Goodman

[57] ABSTRACT

For decoding animated images a processor processes luminance and chrominance information components, and a memory is used to store the corresponding information components relating to one or several images. First the digital data (DEC) are decoded and then the images (GEN) based on these data are generated. As far as the luminance is concerned, images are created by interpolation based on a preceding and a subsequent image. The interpolation (IM1) used for creating an image based on a preceding and subsequent image starts (G) before the end of decoding the luminance data of the subsequent image (Y2), and this interpolation starts after decoding half the number of luminance data of the subsequent image (D). The luminance data of an image of the row N (Y4) are replaced in the memory by those of the image of the row N+4 (Y8) as soon as half the image of the row N+1 (IM5) has been generated.

8 Claims, 3 Drawing Sheets

METHOD OF AND DEVICE FOR DECODING ANIMATED IMAGES

BACKGROUND OF THE INVENTION

1. Field of the Invention

The invention relates to a method of decoding animated images, making use of a decoder for decoding digital data relating to the images, the data being encoded in a compressed form, and having associated therewith a processor for creating images from the decoded data which are luminance and chrominance information components, and a memory for storing said information components, in which method the images are created by interpolating pixels of a preceding image and a subsequent image, while the pixels in the preceding or subsequent image may have an arbitrary position.

Such a method is particularly used in systems for transmitting images for which a moderate rate is particularly required, for example, display systems for animated images recorded on compact discs or DAT recorders, 1 Mb/s channel, and video telephones.

Algorithmic functions known in the field of image compression are used for the encoding operation, for example, discrete cosine transform, adaptive quantization, variable length encoding.

It is also possible, for example, to transmit the motion information of only one out of two frames, the others being reconstructed by symmetrical motion compensation with respect to the frames $(N-1)$ and $(N+1)$.

2. Description of the Related Art

As the decoding operation is performed in known manner, one out of two frames is reconstructed by interpolation using symmetrical motion compensation.

Such a real time decoding of animated images which are tightly compressed requires a large processing power as well as an extensive memory space intended for storing one or several images. The memory size is relatively important and it cannot be realizing in a single circuit integrated with the operative section of the decoder. Consequently, this causes problems of access to this external memory, as the refreshing necessitates a very considerable rate. This problem becomes even more acute when using decoders carrying out interchange encoding algorithms and reconstruction algorithms by means of frame interpolation. For generating a pixel of an image, it is necessary to have access to pixels in other images and thus to preserve several complete images in the memory. Because of the motion compensation, square or rectangular blocks instead of lines are generally used and the blocks to be processed in two different images can be moved away from each other by a distance which is equal to the amplitude of the motion to be compensated. This is the reason why the position of the pixels considered in the preceding or subsequent image may be arbitrary. It is also to be noted that it is also necessary for this decoding operation to have access to decoded pixels of another image because the encoded data may be data relating to the difference between two images.

A decoding device for realized these operations is described in an article in "IEEE Journal on Selected Areas in Communications", Vol. 6, no. 3, April 1986, pages 513, 519. This device uses a plurality of parallel arranged processors and at least four memories (MEM1 to MEM4, FIG. 3).

Such decoders are desired for use in a range of consumer products for which the low cost and the limited number of memory units are of prime importance. A significant part of the cost of such a decoder is represented by the memory. Provide a circuit which can operate with a limited number of memory units.

SUMMARY OF THE INVENTION

An object of the invention is to the invention is based on the recognition that, while giving up access to all the positions of a preceding image during interpolation (meaning, in the case of motion compensation: limiting the maximum length authorized for a motion vector) and giving up the condition of synchronizing the interpolation with respect to the decoding operation, filling of a picture memory with a new image can start earlier so that one memory can be economized.

The method according to the invention is therefore characterized in that the interpolation generating the pixels of an image starts before the end of decoding the data of the subsequent image.

Thus, the memory capacity of a complete frame can be economized.

The article by P. Frencken "Two integrated progressive scan converters" in the Journal "IEEE Transactions on Consumer Electronics", August 1986, shows a process in FIG. 8 in which the compression of the data of frame 8 for generating the frame B' starts before the end of this frame B. However, the technical problem solved according to this document is completely different from that solved in this application and the means used are also different: on the one hand, three vertically adjacent pixels instead of pixels of any position are used for comparison in the relevant document and, on the other hand, there is no question of decoding and thus no question of a temporal relation between decoding and interpolation.

In practice, said interpolation advantageously starts after half the number of data of the subsequent image has been decoded. The replacement of the information components of an image of the row N by those of the image of the row $N+4$ can thus start in the memory as soon as half the image of the row $N+1$ has been generated.

It is advantageous to provide a fixed delay between the start of generating one image and the start of decoding the digital data of another image. In practice, this means that the count of a period is started with the start of generating an interpolated image and that the decoding of a new image is authorized after a fixed period.

In order to further economize on the memory capacity, it is, inter alia, advantageous to start the presentation of an image before the generation of said image is ended.

The device for decoding animated images is characterized in that its image memory comprises:

two sections comprising two luminance frames, respectively, which are temporally spaced by 80 ms, two further sections comprising two chrominance frames, respectively, which are temporally spaced by 40 ms in the case where the invention is only used for luminance data, or temporally spaced by 80 ms in the case where the invention is also used for chrominance data, and one section used as a control buffer and arranged as a FIFO, comprising the codes of a couple of compressed images.

BRIEF DESCRIPTION OF THE DRAWINGS

The invention will now be described in greater detail by way of example with reference to the accompanying drawings in which.

DESCRIPTION OF THE PREFERRED EMBODIMENT

In the relevant embodiment a data base is used which is stored on a compact disc, the data being recorded in a digital form and representing information of various types:

program to be performed by the microprocessor of the system,
alphanumerical data,
graphics displayable on a television type screen,
fixed natural images,
animated sequences of natural images,
sound or words.

Figure 1:
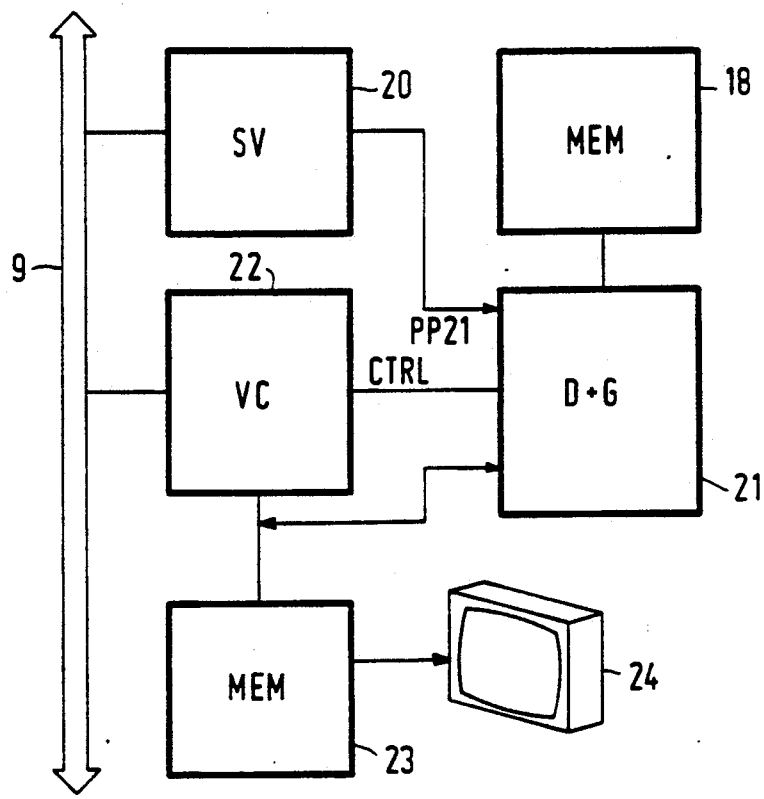
FIG. 1 is a diagram of a system incorporating a decoder in which the invention can be used.

The system for using this data base consists of a digital compact disc reader connected to a system for processing the information shown in FIG. 1 and arranged around a microprocessor and its associated bus 9. A special circuit 22 (Video Controller) is used as an interface with the display device 24 of the television screen type. This circuit 22 controls the reading of a display memory 23 which comprises the images to be displayed and thus ensures that the pixels are read in such a manner that they are supplied to the screen in the television scanning rhythm. The system includes, inter alia, a decoder 21 in which the present invention is used and which decodes the information components of the animated images in the display memory 23 in a rhythm which is sufficient to allow the circuit 22 to read and visualize them.

The encoding operation is performed in accordance with an algorithm which encodes the successive images, denoted IM(N), IM(N+1), IM(N+2)..., in a sequential manner and at a rhythm of 25 Hz. An image IM(N) is composed of a luminance frame denoted Y(N) and a chrominance frame C(N) representing the color difference components denoted U(N) and V(N).

The chrominance of all frames is encoded and the luminance of one out of two frames is encoded, for example, that of the even frames. For these encoding operations, algorithmic functions known in the field of image compression are used: discrete cosine transform (DCT= Discrete Cosine Transform) with motion compensation with respect to the preceding frame, adaptive quantization, variable length coding (VLC= Variable Length Coding). Only the motion information of the odd luminance frames Y(N) is transmitted, which are reconstructed during the decoding operation using motion compensation which is symmetrical with respect to the frames Y(N−1) and Y(N+1).

The decoding algorithm requires at least two luminance frame memories and at least two chrominance frame memories. For decoding an encoded frame, the preceding frame is required and for reconstructing the interpolated luminance frames Y(N), the information components in Y(N−1) and Y(N+1) are required in the memory for the symmetrical motion compensation.

The complete algorithm realized by the decoder 21 can be separated in a decoding process referred to as (DEC) and an image generation process (GEN). The decoding operation DEC consists of decoding the variable length codes, followed by an inverse quantization and a discrete cosine transform with motion compensation, all of which operations are known to those skilled in the art. The image generation is constituted by:

interpolation of the luminance frame which is absent, on the basis of the displacement information,
resampling of the chrominance,
formatting of the images in the format YUV oz DYUV.

Figure 2:
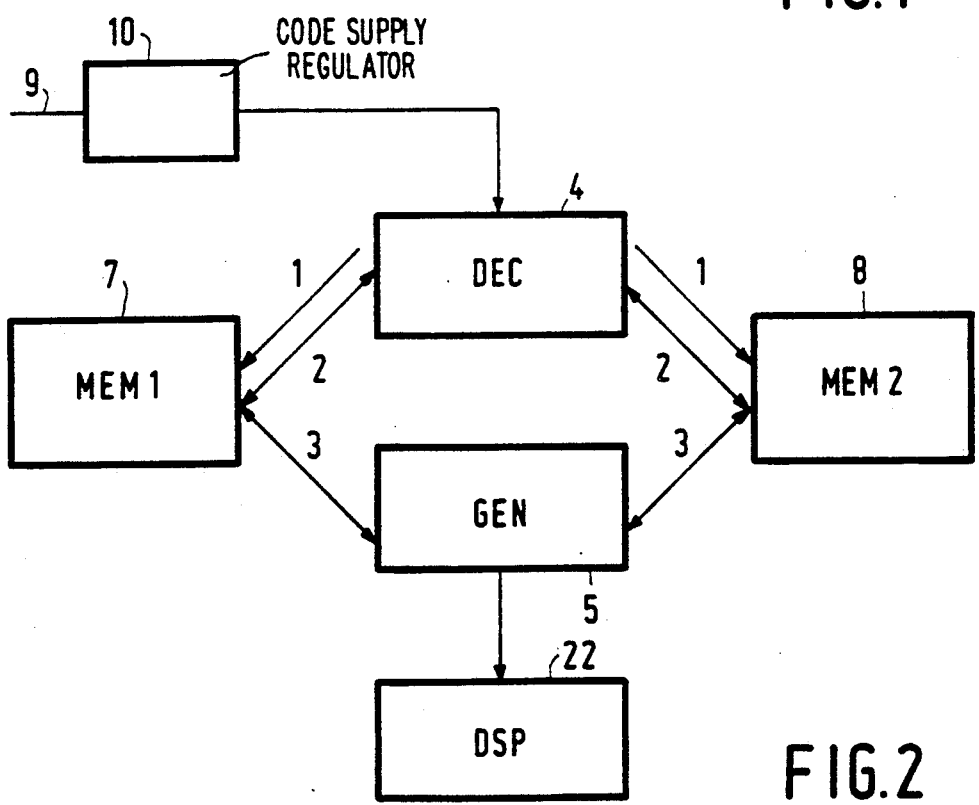
FIG. 2 illustrates the functional partitioning of the decoding process.

In FIG. 2 the algorithm is illustrated in a diagram by means of the essential operations. The codes to be decoded are presented on the bus system 9. The module 10 regulates the supply of the codes which arrive with a variable length at the bus 9. The codes are subsequenty treated in the module 4 which realizes the decoding operation, i.e. inverse quantization and inverse DCT. The data decoded are taken up by the module 5 which generates the images.

Two memories 7 and 8 also denoted by MEM1 and MEM2 are used in turns in a manner symbolized by means of the arrows 1, 2, 3: arrow 1 symbolizes the writing of a decoded block, arrow 2 symbolizes the reading of a motion-compensated block in the preceding frame and arrow 3 symbolizes the reading of a block decoded with or without motion compensation.

A displayable image is finally supplied to the module 22 (which realizes the interface with the display) by means of the image generation module 5 and with the aid of the memories 7 and 8.

Figure 3:
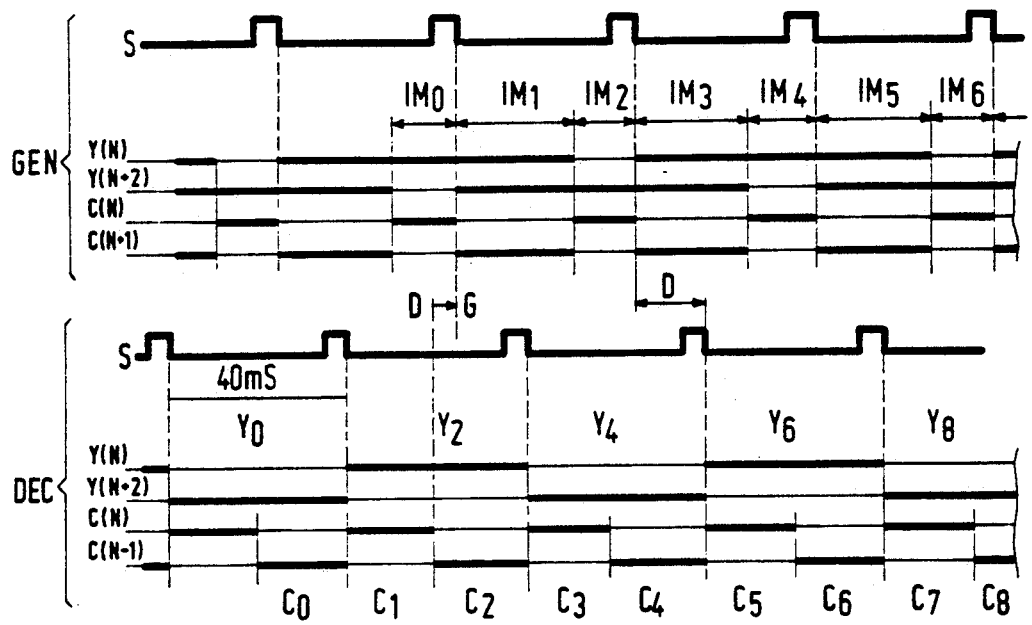
FIG. 3 is a diagram to explain the times of access to the different images in the memory.

FIG. 3 indicates in which manner the different accesses to the memory overlap each other in the course of time. A group of graphs referenced DEC relates to the access memory corresponding to the decoding operation and a group of graphs referenced GEN relates to the access memory corresponding to the image generation. In each of these groups, a signal denoted by S conveys synchronizing pulses (active falling edge) and lines denoted by Y(N), Y(N+2), C(N), C(N+1) indicate, by means of segments shown in fat lines, the periods in which the memory transfers take place which relate to the luminance of an image of the row N (even), the luminance of the image of the row N+2 (thus the luminance of the image transmitted after that of the row N), the chrominance of an image of the row N, and the chrominance of the image of the row N+1 (i.e. the chrominance of the next image). The drawing complies with the temporal conformity of the signals between the groups DEC and GEN and each line Y or C corresponds to a different physical position in the memory.

The part DEC is easy to understand: the chrominance information components of an image are treated twice as fast as the luminance information components of this image because of the spatial sub-sampling of the chrominance and the temporal sub-sampling of the luminance. Thus two chrominance images are treated, while one luminance image is treated. The chrominance data of the images of the row N and N−1 are treated at the same time as the luminance data of the image of the row N. For example, the chrominance data $C_2$ and $C_1$ are treated at the same time as the luminance data $Y_2$, the chrominance data $C_4$ and $C_3$ are treated at the same time as the luminance data $Y_4$, etc. The data $Y_4$ replace the data $Y_0$ in the memory, the data $C_2$ replace the data $C_0$ and also each time when the data are represented on the same line as other data.

The part GEN shows the periods $IM_0$ to $IM_6$ whose indices represent each time the row of the image during its generation with respect to the row N (for example $IM_1$ relates to an image of the row $N+1$ $IM_2$ relates to an image of the row $N+2$, etc.) During generation of the luminance for the image $IM_0$ (of the row N), which is effected without interpolation, the memory transfers relate to the luminance and chrominance of the image of the row N, which is indicated by a fat part on the lines Y(N) and C(N). During generation of the luminance for the image $IM_1$ (of the row $N+1$), which is effected by means of interpolation between the images N and $N+2$, the memory transfers relate to these two images, which is indicated by a fat part on the lines Y(N) and Y(N+2). It is to be noted that the generation of an odd image (luminance interpolated) is effected in a period of time which is twice as long as for an even image because it must read two luminance frames to generate one. As far as the chrominance is concerned, the image $IM_1$ is generated by accessing the chrominance of the row $N+1$, because there is no interpolation, and this is indicated by a fat part on the line C(N+1), and so forth.

The generation of the odd frame IM1 by means of interpolation starts at the moment illustrated by a vertical line G before the end of decoding the luminance data of the subsequent frame $Y_2$, (in the group DEC), and more precisely after decoding half the number of these data illustrated by the vertical line D. The luminance data of a frame of the row N are replaced in the memory by those of the frame of the row $N+4$ as soon as half the luminance of the frame of the row $N+1$ has been generated, for example $Y_8$ starts to replace $Y_4$ before the end of $IM_5$, more precisely when half of $IM_5$ has been generated. These two requirements imposed on the limits provide the value to be given to the fixed delay between the generating process and the decoding process. The fixed delay is illustrated by D between the start of generating an image $lM_3$ and the start of decoding $Y_6$, $C_5$ of another image. As the duration of each process is fixed, this also means that there is a delay of $Y_6$ with respect to $IM_8$ or a delay of $lM_4$ or $lM_5$ with respect to $Y_6$.

The generation of a non-interpolated (even) image starts after the end of decoding the luminance and chrominance data of this frame, and the generation of an interpolated image starts after the end of decoding the chrominance data of this frame. For example, the generation of $IM_2$ starts after the end of decoding the luminance data $Y_2$ and chrominance data $C_2$ and the generation of an interpolated image $lM_1$ starts after the end of decoding $C_1$.

The generation of the images is thus synchronous with the decoding of images, which permits of utilizing the image buffers required for generating the images when both reading and writing. Thus one economizes on the storing of a luminance frame and a chrominance frame. As the interpolation of the luminance frame relative to the generation of the odd image is effected "instantly", it is not necessary to store this frame and hence there is a memory gain of one complete image.

Due to the particular organization described above of the sequence of decoding and generating the images, a decoder memory capacity corresponding to two images is sufficient, because the generated image is directly supplied to the display memory. This memory capacity reduction requires a small number of units. Consequently, the size of the data bus is reduced: the bus has in effect a width which is at most equal to the number of units multiplied by the number of bits which are parallel accessible in a unit. This establishes the maximum rate between the decoder and its memory.

As the decoding algorithm is differential, $Y(N+2)$ is decoded from $Y(N)$ and $C(N+2)$ is decoded from $C(N+1)$, and the arrangement of the memory in two luminance buffers and two chrominance buffers permits of realizing a decoding operation (inverse VLC, inverse quantization, inverse DCT with motion compensation) in accordance with the sequence shown in FIG. 3.

With respect to the luminance, the reconstruction of the frame Y(N) by symmetrical motion compensation implies that the vertical displacements do not pass beyond half the vertical dimension of the image at 40 ms. It is to be noted that the critical vertical displacements hardly pass beyond 32 pixels in 40 ms, in other words, the algorithmic limit will never be reached with the standard image format (for example $256 \times 352$ pixels).

The least expensive memories are dynamic memories. The drawback of such memories is their long access time in the random access mode, which is due to multiplexing of the addresses in two fields (rows and columns). To mitigate this drawback, the processing operations are organized in such a manner that the access to the memory is effected for the greater part by bursts of consecutive address words relating to one and the same row ("page" mode). Buffer memories for constituting these bursts are added to the interior of the circuit. This operation mode permits access to the dynamic memory in the page mode in which only the column address is specified for each word and which provides a considerable rate which is typically superior to that of the static memories of equivalent size. All the required transfers may thus be conducted with a data bus routing a single pixel at a time, which is compatible with the small width of the above-mentioned bus. The combination of these measures (access in bursts and reduction of the number of intermediate images) results in a particularly economical solution.

Figure 4:
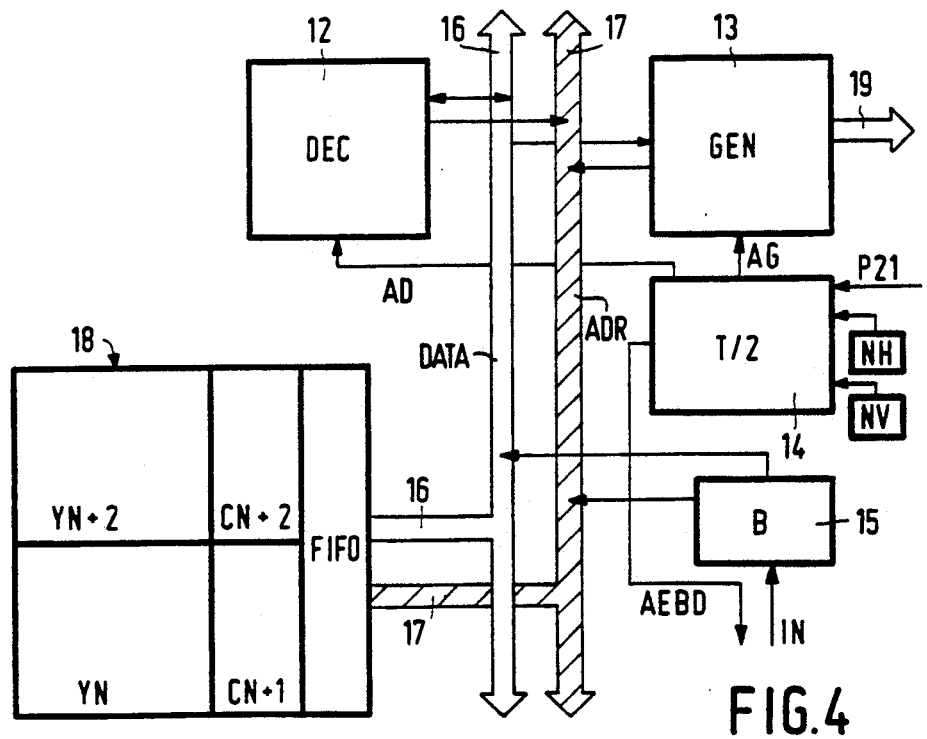
FIG. 4 is a diagram of a decoder and a memory for carrying out the method according to the invention and FIGS. 5 and 6 are time diagrams showing the synchzonization between the decoding operation and the generation of the images.

The block diagram of the decoder and its associated memory for carrying out the method is shown in FIG. 4. At the start of a sequence of images to be decoded from a supervisor (not shown), an automatic unit 14 receives information components supplying horizontally the number NH of image blocks and vertically the number NV of image blocks. Based on these parameters, it counts all the T/2 time units (the value of T will be explained hereinafter) and generates validation signals AG and AD for a generation module 13 and a decoding module 12, respectively, as well as an authorization signal AEBD for writing the code in the control buffer memory 15 having a capacity of several kilo-octets.

The data are conveyed between the buffer memory 15, the generation module 13 and the decoding module 12 and a memory 18 by means of a data bus 16 and with the aid of an address bus 17.

The system is built around a single memory 18 comprising the equivalent of two intermediate images in which the decoder reads and writes the values of the pixels pertaining to these images. This memory comprises:

two luminance frames which are temporally spaced by 80 ms, namely $Y_N$ and $Y_{N+2}$, two chrominance frames which are temporally spaced by 40 ms, namely $C_{N+1}$ and $C_{N+2}$, the control buffer memory arranged as a FIFO and comprising the code of a couple of compressed images.

The decoder must be able to supply a couple of images in less than 80 ms to the display device. If this device is to display the images in a rhythm of less than 25 images per second, the decoder may stop the generation of images and consequently the decoding operation under the command of the supervisor.

The supervisor applies to the automatic unit 14 a signal for starting the generation of a couple of images P2I (ready for 2 images). This signal passes to the high state with a periodicity which is more than or equal to 80 ms. Based on this signal the decoder generates internally the signals denoted:

AGP (waiting time for generating even images)
AGI (waiting time for generating odd images)
AD (waiting time for decoding)
AEBD (waiting time for writing the decoder buffer memory).

Figure 5:
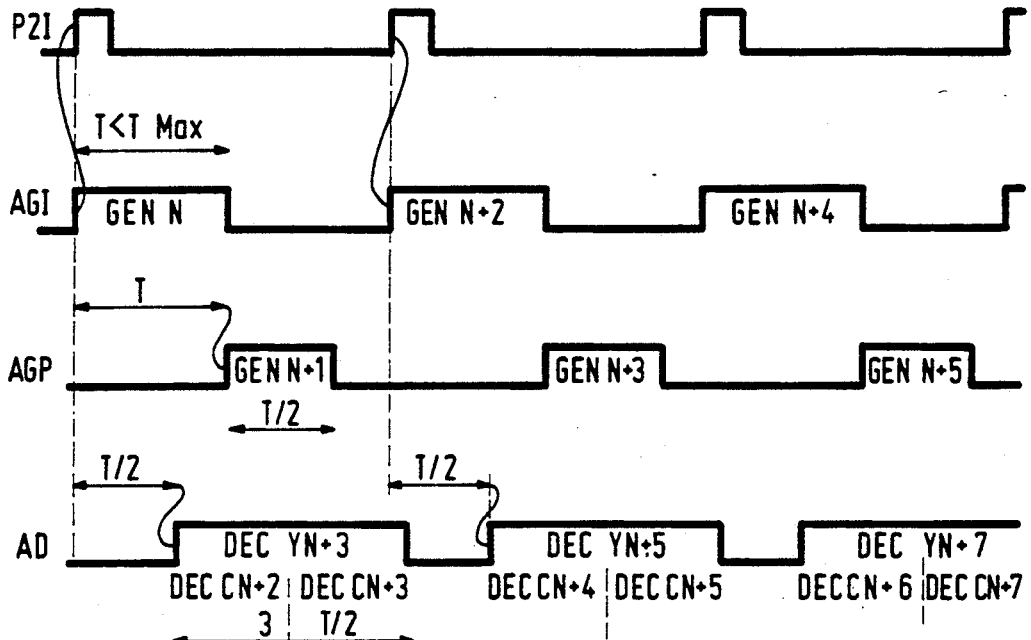
Figure 6:
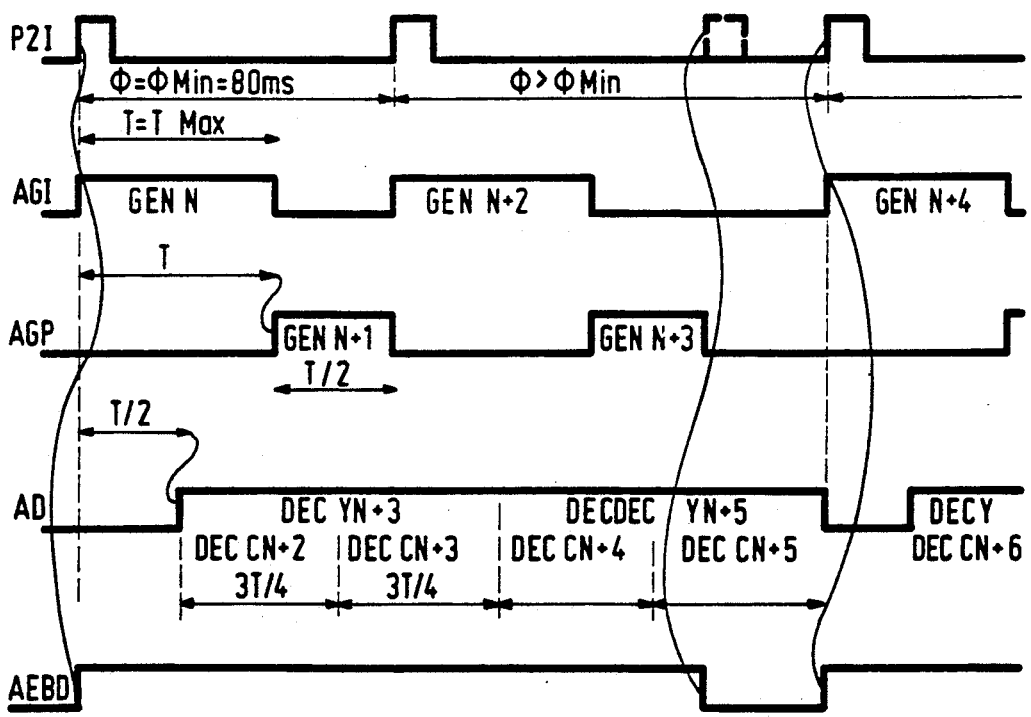

The signals P2I, AGI, AGP, AD and AEBD are illustrated in FIGS. 5 and 6 which show the synchronization of the decoding and image generation processes. The FIGS. use the references (GEN, $Y_N$, etc.) already employed hereinbefore. The time base for generating an even image is indicated by T FIG. 5 relates to the case where images are decoded which have a maximum size at a display frequency of less than 25 Hz. FIG. 6 relates to the case where the size of the images is smaller than the maximum authorized size. In this case the process is ended at an instant indicated by the falling edge of the signal AEBD and there is thus a waiting time before the start of the next process.

The system described above requires the processes GEN and DEC to be realized in a fixed time, and the memory 18 which is connected to a single bus must be partitioned for these two processes. This presents a problem which can be solved by attributing the temporal windows of fixed length to each of the processes GEN and DEC for accessing the memory. The size and the repetition frequency of these windows must be determined as a function of the number of memory accesses to be effected during the time designated for each process, as is shown in FIG. 6, and as a function of the width of the communication bus between the decoder 18 and its memory 21 (FIG. 4).

The performance of the decoding system depends on the computing power of the decoder (maximum number of blocks that can be decoded per time unit) and the passband of the units with which the decoder communicates (number of exchanges per unit of time). The performance of the decoding system is to ensure that $T+T/2$ (see FIGS. 5 and 6) is less than 80 ms for ensuring the generation as well as the decoding of a couple of images in less than 80 ms. It is to be noted that the performance of the decoding system must be calculated for the maximum size of the image. If the format of the images is reduced the decoding will be effected as indicated in FIG. 6.

The automatic unit authorizes the writing in the control memory when it receives the signal P2I every 80 ms. It internally counts during 80 ms after the arrival of each signal P2I. If at the end of 80 ms it does not receive a new signal P2I, it inhibits each new writing in the control memory until the new signal P2I has arrived.

Such a system prevents any overflow of the control memory.

In the method and device described above an interpolation process has been used only for the luminance, but it is evident that the process can also be used in those cases where it is preferred to transmit only one out of two chrominance frames and thus recreate one chrominance frame out of two by means of interpolation. In this case it will be easy to those skilled in the art to provide the necessary modifications because it is simply a matter of applying the aforementioned description of the luminance to the chrominance, and notably in FIG. 3 it is necessary to replace the lines C(N) and C(N+1) or C(N−1) by lines C(N) and C(N+2) having active periods at the same instants as for the lines Y(N) and Y(N+2) and in FIG. 4 it is necessary to replace the indication CN+1 in the memory 18 by the indication CN.

I claim:

1. A method of decoding animated images, said method comprising the steps:
   decoding digital data relating to the images, said data having been encoded in a compressed form;
   generating images from the decoded data which are luminance and chrominance information components; and
   storing said information components; wherein said step of generating images comprises interpolating pixels of a preceding image and a subsequent image, while the position of the pixels in the preceding or subsequent image may be different from that of the pixel to be generated, characterized in that said interpolating pixels of an image starts before the end of decoding the data of the subsequent image.

2. A method as claimed in claim 1, characterized in that said interpolating pixels starts after half the number of data of the subsequent image has been decoded.

3. A method as claimed claim 2, characterized in that the replacement of the information components of an image a row N by those of the image of a row N+4 starts in the memory as soon as half the image of a row M+1 has been generated.

4. A method as claimed in claim 1, 2 or 3, characterized in that there is a fixed delay between the start of generating one image and the start of decoding the digital data of another image.

5. A method as claimed in claim 4, characterized in that the count of a period is started with the start of generating an interpolated image and in that the decoding of a new image is authorized after a fixed period.

6. A method as claimed in claim 1, 2 or 3, characterized in that the display of an image is started before the generation of said image is ended.

7. A device for decoding animated images, comprising a decoder for decoding digital data relating to the images, which data are encoded in a compressed form, associated with a processor for creating images from the decoded data which are luminance and chrominance information components, and a memory for storing said information components, the images being created by interpolating pixels of a preceding image and a subsequent image, while the position of the pixels in the preceding or subsequent image may be different from that of the pixel to be created, characterized in that said memory comprises
   two sections comprising two luminance frames, respectively, which are temporally spaced by 80 ms, two further sections comprising two chrominance frames, respectively, which are temporally spaced by 40 ms, and one section used as a control buffer and arranged as a FIFO comprising the codes of two compressed images.

8. A device for decoding animated images, comprising a decoder for decoding digital data relating to the images, which data are encoded in a compressed form, associated with a processor for creating images from the decoded data which are luminance and chrominance information components, and a memory for storing said information components, the images being created by interpolating pixels of a preceding image and a subsequent image, while the position of the pixels in the preceding or subsequent image may be different from that of the pixel to be created, characterized in that said memory comprises two sections comprising two luminance frames, respectively, which are temporally spaced by 80 ms, two further sections comprising two chrominance frames, respectively, which are temporally spaced by 80 ms, and one section used as a control buffer and arranged as a FIFO comprising the codes of two compressed images.

* * * * *